US007414197B2

(12) United States Patent
Ortiz et al.

(10) Patent No.: US 7,414,197 B2
(45) Date of Patent: Aug. 19, 2008

(54) ELECTROMAGNETIC INTERFERENCE SHIELDING OF ELECTRICAL CABLES AND CONNECTORS

(75) Inventors: Jesus Al Ortiz, San Jose, CA (US); Rocky R. Arnold, San Jose, CA (US)

(73) Assignee: WaveZero, Inc., Sunnyvale, CA (US)

( * ) Notice: Subject to any disclaimer, the term of this patent is extended or adjusted under 35 U.S.C. 154(b) by 0 days.

(21) Appl. No.: 11/400,271

(22) Filed: Apr. 7, 2006

(65) Prior Publication Data

US 2006/0185884 A1 Aug. 24, 2006

Related U.S. Application Data

(60) Continuation of application No. 10/691,391, filed on Oct. 21, 2003, now Pat. No. 7,102,082, which is a division of application No. 09/785,973, filed on Feb. 16, 2001, now Pat. No. 6,643,918.

(60) Provisional application No. 60/203,263, filed on May 9, 2000, provisional application No. 60/202,842, filed on May 8, 2000, provisional application No. 60/199,519, filed on Apr. 25, 2000, provisional application No. 60/198,282, filed on Apr. 17, 2000.

(51) Int. Cl.
*H02G 15/02* (2006.01)

(52) U.S. Cl. ...................................... 174/74 R; 174/78

(58) Field of Classification Search .................. 174/36, 174/110 R, 110 SC, 74 R, 77 R, 78, 84 R, 174/88 R
See application file for complete search history.

(56) References Cited

U.S. PATENT DOCUMENTS

| | | | | | |
|---|---|---|---|---|---|
| 3,469,016 | A | | 9/1969 | Shelton | |
| 3,576,723 | A | * | 4/1971 | Angele | 174/36 |
| 3,639,674 | A | | 2/1972 | Stier | |
| 3,744,128 | A | * | 7/1973 | Fisher et al. | 29/858 |
| 3,757,029 | A | | 9/1973 | Marshall | |
| 4,106,839 | A | | 8/1978 | Cooper | |
| 4,209,215 | A | | 6/1980 | Verma | |
| 4,234,759 | A | | 11/1980 | Harlow | |
| 4,236,779 | A | | 12/1980 | Tang | |
| 4,433,206 | A | | 2/1984 | Lewis | |
| 4,457,576 | A | | 7/1984 | Cosmos et al. | |
| 4,475,006 | A | | 10/1984 | Olyphant, Jr. | |
| 4,489,116 | A | | 12/1984 | Flood | |
| 4,497,533 | A | * | 2/1985 | Genova et al. | 439/88 |
| 4,508,414 | A | * | 4/1985 | Kusui et al. | 439/610 |
| 4,515,993 | A | | 5/1985 | MacKenzie | |
| 4,542,076 | A | | 9/1985 | Bednarz et al. | |
| 4,564,723 | A | | 1/1986 | Lang | |

(Continued)

OTHER PUBLICATIONS

Adams; *Taking the Mystery Out of Metallizing*, Vacuum Technology (Nov. 1975) Technical Publishing Company, 4 pages total.

(Continued)

*Primary Examiner*—William H Mayo, III
(74) *Attorney, Agent, or Firm*—Townsend and Townsend and Crew LLP

(57) ABSTRACT

A shielded cable includes a cable body that is surrounded by a vacuum metallized layer. The metallized layer can be grounded with a metallized thermoform connector. Optionally, an insulating top coating can be disposed over the metallized layer over the cable body.

6 Claims, 7 Drawing Sheets

U.S. PATENT DOCUMENTS

| | | | | | |
|---|---|---|---|---|---|
| 4,597,624 | A | * | 7/1986 | Lax et al. | 439/610 |
| 4,684,197 | A | | 8/1987 | Reichardt et al. | |
| 4,714,905 | A | | 12/1987 | Bernstein et al. | |
| 4,721,483 | A | * | 1/1988 | Dickie | 439/610 |
| 4,748,293 | A | | 5/1988 | Kikuchi et al. | |
| 4,842,553 | A | * | 6/1989 | Ingram | 439/583 |
| 4,845,311 | A | | 7/1989 | Schreiber et al. | |
| 4,846,724 | A | * | 7/1989 | Sasaki et al. | 439/610 |
| 4,933,060 | A | | 6/1990 | Prohaska et al. | |
| 4,972,041 | A | | 11/1990 | Crawley et al. | |
| 4,973,514 | A | | 11/1990 | Gamble et al. | |
| 4,983,452 | A | | 1/1991 | Daimon et al. | |
| 4,988,550 | A | | 1/1991 | Keyser et al. | |
| 5,003,126 | A | | 3/1991 | Fujii et al. | |
| 5,008,487 | A | | 4/1991 | Shimmyo | |
| 5,017,419 | A | | 5/1991 | Smith | |
| 5,028,490 | A | | 7/1991 | Koskenmaki et al. | |
| 5,047,260 | A | | 9/1991 | Durand | |
| 5,071,519 | A | | 12/1991 | Ferrill et al. | |
| 5,170,009 | A | | 12/1992 | Kadokura | |
| 5,180,639 | A | | 1/1993 | Zarnoch | |
| 5,191,544 | A | | 3/1993 | Benck et al. | |
| 5,206,796 | A | | 4/1993 | Thompson et al. | |
| 5,209,987 | A | * | 5/1993 | Penneck et al. | 428/610 |
| 5,214,242 | A | | 5/1993 | Gallagher | |
| 5,225,629 | A | | 7/1993 | Garrett | |
| 5,226,210 | A | | 7/1993 | Koskenmaki et al. | |
| 5,235,492 | A | | 8/1993 | Humbert et al. | |
| 5,250,342 | A | | 10/1993 | Lang et al. | |
| 5,270,488 | A | | 12/1993 | Ono et al. | |
| 5,281,762 | A | | 1/1994 | Long et al. | |
| 5,405,000 | A | | 4/1995 | Hagedon et al. | |
| 5,436,803 | A | | 7/1995 | Annis et al. | |
| 5,455,383 | A | * | 10/1995 | Tanaka | 174/36 |
| 5,470,238 | A | | 11/1995 | Walden | |
| 5,483,020 | A | | 1/1996 | Hardie et al. | |
| 5,559,677 | A | | 9/1996 | Errichiello | |
| 5,571,992 | A | | 11/1996 | Maleski et al. | |
| 5,574,815 | A | | 11/1996 | Kneeland | |
| 5,749,744 | A | | 5/1998 | Henderson et al. | |
| 5,811,050 | A | | 9/1998 | Gabower | |
| 5,829,991 | A | | 11/1998 | Murphy et al. | |
| 5,885,710 | A | * | 3/1999 | MacDonald et al. | 428/375 |
| 5,966,803 | A | | 10/1999 | Wilson | |
| 5,967,855 | A | | 10/1999 | Asakura et al. | |
| 6,036,539 | A | | 3/2000 | Rigby et al. | |
| 6,047,660 | A | | 4/2000 | Lee | |
| 6,080,018 | A | | 6/2000 | Ferrill et al. | |
| 6,109,969 | A | | 8/2000 | Kuo et al. | |
| 6,123,556 | A | | 9/2000 | Asakura et al. | |
| 6,127,038 | A | | 10/2000 | McCullough et al. | |
| 6,624,432 | B1 | | 9/2003 | Gabower et al. | |

OTHER PUBLICATIONS

Adams; *Taking the Mystery Out of Metallizing-II*, Vacuum Technology (Dec. 1975) Technical Publishing Company, 3 pages total.
Adams; *Taking the Mystery Out of Metallizing-III*, Vacuum Technology (Feb. 1976) Technical Publishing Company, 4 pages total.
Gabower, *Thermoformed Vacuum-Metallized Inserts For EMI Shielding*, ITEM (1995) The International Journal of EMC, Robar Industries, Inc., pp. 120, 122, 123, and 127.
Gwinner, *Vacuum Evaporated Aluminum for Selective Shielding of Plastic Housings*, ITEM (1993) The International Journal of EMC, Robar Industries, Inc., pp. 138, 140, 290, 292, 294, and 296.
Hasler, *Electroplating and Vacuum Metalizing*, Galvanotechnic (1984) vol. 2, 5 pages total.
Kimmel et al., *Shielding for EMI control . . . and how to do it right*, EDN (Jan. 20, 1994) pp. S59-S69.
Leonard, *What's Hot and What's Not in EMI Shielding of Plastics*, Plastics Design Forum (Mar./Apr. 1993) pp. 32-35.
Smock, *Trend to Lower Cost Resins Will Accelerate*, Plastics World (Apr. 1995) 1 page total.
Chomerics, Inc., *EMI Shielding for Commercial Electronics* (1994) pp. 4-5, 30-33.
Concise Encyclopedia of Polymer Science & Engineering, John Wiley & Sons, (1990) ISBN 0-471-51253-2, pp. 446-746, 1192-1195.
Holland, *Degassing of Plastic Materials/Plasticizers*, Vacuum Deposition of Thin Films, Chapman & Hall Ltd., London (1966) pp. 46-47, 52-53.
*EMI Protection in Consumer Portable Products*, Electronic Packaging and Production (Mar. 1994) pp. 40-44.
Grerg et al., *Machinery's Handbook*, Industrial Press, New York (1976) pp. 2299-2301.
*Vacuum Metallizing Electrical Problems*, TIPS, Midwest Tungsten Service (1986) 2 pages total.
*6100 Thermoformable EMI-Shielding Material*, Minnesota Mining & Mfg. Co. (1994) 2 pages total.
*Silver-Coated VALOX FR-1 Film Provides Shielding For Circuit Breakers*, GE Films in Action (Jun. 1994) General Electric Co., 1 page total.
*Ultrasonic Welders Advance Clamshell-Sealing Process*, Packaging (Oct. 1994) pp. 78-21.
*EMI/RFI Products* EE—Evaluation Engineering (Apr. 1995) pp. 64.
*Silver Shielding for the Highest Performance*, Swift Textile Metalizing Corporation, ITEM (1995) pp. 11, 15, 109, 112, 113, 115, 116, 212, 213, 267, 269.

* cited by examiner

ELECTROMAGNETIC INTERFERENCE SHIELDING OF ELECTRICAL CABLES AND CONNECTORS

CROSS-REFERENCES TO RELATED APPLICATIONS

This application is a continuation of U.S. application Ser. No. 10/691,391 filed Oct. 21, 2003, which is a divisional of U.S. application Ser. No. 09/785,973 filed Feb. 16, 2001, now U.S. Pat. No. 6,643,918, which claims the benefit of U.S. Provisional Application No. 60/198,282 filed Apr. 17, 2000, U.S. Provisional Application No. 60/199,519 filed Apr. 25, 2000, U.S. Provisional Application No. 60/202,842 filed May 8, 2000, and U.S. Provisional Application No. 60/203,263 filed May 9, 2000, each of which is expressly incorporated herein by reference in its entirety for all purposes.

BACKGROUND OF THE INVENTION

The present invention relates generally to shielding of electromagnetic interference (EMI) and radiofrequency interference (RFI). More specifically, the present invention relates to metallization and grounding of electrical cables and connectors to provide electromagnetic shielding from electromagnetic interference, radiofrequency interference, and electrostatic discharge (ESD). As subsequently used herein, "EMI" shall include ESD, RFI, and any other type of electromagnetic emission or effect.

Cables and connectors must be allowed to deliver their signals unimpeded. Unfortunately, cables and connectors for connecting electronic devices and specialized cabling that incorporate passive and active electrical devices in a flexible substrate material (e.g., flexible circuits) are both receptors and emitters of EMI radiation. Impingement of EMI can disrupt the functionality of the cable and connectors, and in some cases may cause electronic failure of the cables. With microprocessor speeds continuing to increase, the creation of EMI is a substantial concern to designers, manufacturers, and owners of electronic equipment.

Conventional cable shielding solutions include flexible conductive braiding, conductive epoxies, and conductive foils or tapes that can be wrapped around the dielectric cladding of the cable to provide shielding. Unfortunately, each of the conventional solutions has various drawbacks. For example, the conductive braiding is costly, the conductive epoxies are also costly and difficult to apply to the cladding, and the conductive foils and tapes must manually be wrapped around the cable body.

A particular problem of convention shielding solutions is leakage at the joint where the cable body shielding and connector attach. Gaps or "slot antennas" at joints or seams that break the continuous nature of the shield is a primary reason why shielding effectiveness degrades.

Current shielded cable solutions can provide shielding effectiveness in the range of 20 dB to 50 dB. Unfortunately, with the higher-speed microprocessor technology that is presently in use (and that is being developed) there is a need to provide consistent integrated designs of enclosures, cables, and connectors in the range of 55 dB or higher.

The above mentioned conventional solutions do not provide a high degree of shielding effectiveness and have high leakage problems (thus causing a loss of shielding effectiveness) and often require the use of manual assembly to apply the shields over the connectors and cables. Accordingly, what is needed are systems and methods which provide adequate EMI shielding to cables and connectors.

SUMMARY OF THE INVENTION

The present invention provides cables having a body that is surrounded by a vacuum metallized layer. The metallized layer can be grounded with a metallized thermoform connector to prevent the release or impingement of harmful EMI radiation. Optionally, an insulating top coating can be disposed over the metallized layer over the cable body.

In one embodiment, the metallized layer is coupled to the ground with a conductive connector that is positioned on an end of the cable body. Exemplary conductive connectors of the present invention are typically composed of a metallized thermoform. The thermoform is either a one piece (i.e. clamshell) or two piece assembly. The thermoform can be sized to substantially conform to the shape of a pin connector assembly of the cable body. The metal layer on the thermoform is electrically coupled to an exposed portion of the metallized layer on the cable body by snap fitting the thermoform around the end of the cable with a tongue and groove assembly, press fit with a conductive epoxy or gasket, laser welded, or the like.

In some arrangements, the entire cable body is surrounded by the metallized thermoform to shield the conductors disposed within the cable. The thermoform will typically be thin walled or ribbed so as to allow flexing of the cable body. The metallized layer can be disposed along either an inner surface of the thermoform (so as to not require an insulating layer) or along the outside layer. If the metallized layer is disposed on the outside layer, there will typically be an insulating layer covering the metallized layer to prevent electrical contact with any surrounding electronic elements.

Metallization of the cable body and thermoform can be applied through vacuum deposition (i.e., cathode-sputtering, ion-beam, or thermal vaporization), painting, electroplating, electroless plating, zinc-arc spraying, or the like.

In exemplary embodiments, metallization of the cable body and of the thermoform is through a vacuum deposition process, which maintains a temperature of the cable body or thermoform typically below approximately 150° F., and preferably below approximately 120° F. during the manufacturing process. The low temperature vacuum deposition process can create a substantially uniform conductive layer without substantially warping or distort the underlying thermoform or dielectric. The evenly coated surfaces, creases, recesses, and edges of the thermoform create less impedance variations in the conductive layer and the overall shielding effectiveness of the shield can be improved.

The metallized layers of the present invention can theoretically provide attenuation levels between 0 dB and 110 dB, but typically between 20 dB and 70 dB. It should be appreciated, however, that it may be possible to provide higher attenuation levels by varying the thickness and material of the metallization layer.

To reduce the EMI leakage at the joint between the connector and cable body, the attachment surfaces of the metallized thermoform connector can include bumps, protrusions, or other blocking elements that reduce the size of the gaps to a size that is no larger than one half the wavelength of the target EMI/RFI radiation.

In one exemplary embodiment, the present invention provides a method of shielding a cable. The method includes providing conductive leads encapsulated within a dielectric layer. A metallized layer is applied over the dielectric layer. A metallized thermoform connection assembly can be electrically coupled to the metallized layer over the dielectric layer and a grounded housing. In exemplary methods, the metallized layers are thermally vaporized onto the dielectric layer and the thermoform so as to form a substantially uniform layer.

In some embodiments a base coating will be applied between the dielectric cladding (or polymer overcoat) and a vacuum metallized layer to improve adhesion. In most configurations an insulating top coating is applied over the metallized layer to prevent electrical contact of the metallized layer with adjacent electrical devices or components.

In another exemplary embodiment, the present invention provides a cable shield. The cable shield includes a thermoform body having an inner surface and an outer surface. A metal layer is applied to either the inner or outer surface. A cable body can be disposed within the thermoform shield. The cable shield can be grounded to provide EMI shielding for the cable body. The thermoform body can comprise a single "clamshell" piece or two separate bodies that can fit around the cable body. Optionally, the thermoform body can be ribbed so as to allow the cable body to flex and bend.

In some embodiments, the cable body and/or thermoform can be metallized over two surfaces. In addition to increasing attenuation of the impinging radiation by 10 dB to 20 dB, the second metallized layer provides insurance against the creation of a slot antenna. Thus, if one of the layers is scratched or otherwise damaged, the second metallized layer can still block the emission or impingement of the radiation.

For a further understanding of the nature and advantages of the invention, reference should be made to the following description taken in conjunction with the accompanying drawings.

DESCRIPTION OF THE SPECIFIC EMBODIMENTS

Figure 1:
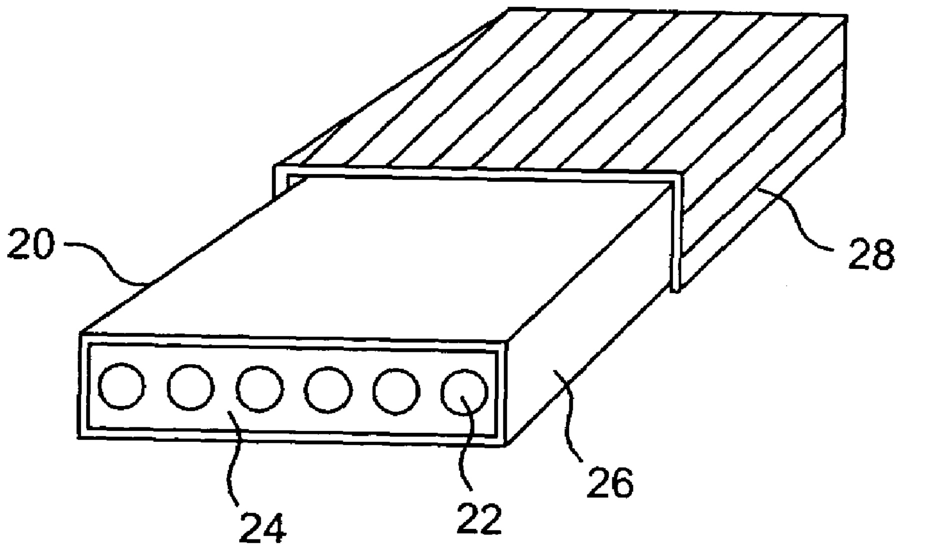
FIG. 1 is a simplified perspective view of a cable having a metallized layer around the cable body.

The present invention provides methods and systems for shielding cables and connectors from electromagnetic and radiofrequency interference (e.g., EMI and RFI).

Cables of the present invention will generally include a cable body having two ends. A male/female pin connector assembly can be disposed on at least one end of the cable body to facilitate attachment to a corresponding female/male connector on a grounded electronic component or housing. The EMI shields of the present invention will typically surround both the cable body and connector assembly to shield the entire cable body.

In an exemplary embodiment, an aluminum conductive layer is added onto the cable body through vacuum deposition. During application, the solidified pieces of material are vaporized and adhered to the cable body (i.e. dielectric layer or polymer overcoating) in a low heat process so as to not damage the underlying components. If necessary, a base coating may be applied to the substrate prior to the vacuum deposition to improve adhesion of the metal layer to the cable body. It should be appreciated that aging or heat treatment for curing is not generally required for the vacuum deposition. Moreover, vacuum deposition can deposit a thin layer onto the substrate in a low heat process. The low heat process can reduce heat damage to the underlying electronic components while producing a continuous and less stressed layer metallized layer.

The thickness of the conductive layer will primarily depend on the frequency level of the radiation. In general, the thickness of the conductive layer will typically be between one-tenth of a micron to twelve microns. In general, the conductive layer can shield across a wide range of frequencies, generally from less than 100 MHz to greater than 10 GHz. For higher frequency radiation, the thickness of the metallized layer will be near the thinner end of the range. In contrast, for lower level frequency radiation, the thickness of the metallized layer will be at the higher end of the range.

In exemplary embodiments, a metallized thermoform connector assembly can be positioned around the pin connector assembly to electrically ground the metallized cable body to a grounded housing. Thermoforming of the connector assembly typically comprises heating a sheet and forming it into a desired shape. The process includes heating a thermoplastic composite sheet until it becomes soft and pliable, then using either air pressure or vacuum to deflect the softened sheet towards the surface of a mold until the sheet adopts the shape of the mold surface. The sheet sets are cooled to allow the sheets to maintain the required shaped. After cooling the sheets can be removed from the mold and thereafter metallized. The metallized thermoform can be metallized along the inner surface, outer surface, or both surfaces. Some typical thermoformable materials include acrylonitrile-butenate-styrene (ABS), polystyrenes, cellulose polymers, vinyl chloride polymers, polyamides, polycarbonates, polysulfones, olefin polymers such as polyethylene, polypropylene, polyethylene terephthalate glycol (PTG), methyl methacrylate-acrylonitrile, and the like.

Applicants have found that using thermoform substrates for shielding provides benefits not found in conventional injection molded parts. For example, adhering the metallized layer to the thermoform is faster and more economical than adhering the metallized layer to an injection molded part. Injection molded parts often need a mold release to process the parts. Even if assurances are taken to avoid the mold release, slide and ejector pin lubricants can contaminate the injection molded parts. The mold release and lubricants necessitate cleaning of the injection molded part prior to metallization to insure the adhesion of the metal layer. Because thermoforms can be formed without the assistance of the mold release and lubricants, the manufacturing process is simplified. Because of the manufacturing process, the thermoform substrate can have a lighter weight so as to provide a lighter EMI shield relative to injection molded parts.

In some embodiments, the thermoform conductive connector will be detachable from the metallized layer on the cable body. Thus, the conductive connector may be a one piece ("clamshell shape") or a two piece assembly that can be attached (and detached) around the cable body. In general, the conductive connector will have mating surfaces to couple the connector about the cable. For example, mating surfaces of the split connector may have a tongue and groove assembly that can create a tight fitting snap fit. A more complete description of foldable (i.e., split) thermoformable housings can be found in U.S. Pat. No. 5,811,050 to Gabower et al., the complete disclosure of which is incorporated herein by reference for all purposes.

In some arrangements, the metallized conductive layer over the cable body can be covered with an insulating conformal topcoating. The topcoating can be for strength, toughness, protection from environmental conditions (e.g., UV radiation, moisture, or the like), insulation, or the like. The topcoating can be composed of a variety of materials, including but not limited to, acrylic, neoprene, two-part epoxies, one-part epoxies, urethanes, and polyester materials, or the like. At the end of the cable, the top insulating coat can be removed (or masked during application) to expose the underlying metallized layer so as to allow the electrically conductive connector to electrically contact the metallized conductive layer. If the connector needs to be removed and/or replaced the connector can simply be removed and reattached over the exposed portion of the conductive layer to reestablish the electrical contact with the conductive layer.

While the remaining figures show flat ribbon cable, it should be appreciated that the present invention also relates to round cable, flexible circuitry, wire harnesses, and other conductive leads.

FIG. 1 shows a metallized cable body 20 incorporating the novel aspects of the present invention. The cable body 20 includes conductors 22 disposed within a dielectric substrate 24 such as PVC, polycarbonate, Kapton, ABS, Lexan, Valox, FR4, G-10 woven fiberglass, or the like. A metallized layer 26 can be vacuum deposited or otherwise adhered onto an outer surface of the dielectric substrate 24 or polymer overcoating (not shown) to substantially encapsulate the dielectric layer 24 and conductors 22. Optionally, a base coating (not shown) can be applied to the dielectric substrate or overcoating to help improve adherence of the metallized layer 26. When properly grounded, the metallized layer can block the emission and impingement of electromagnetic energy. In some configurations, an insulating top coat 28 can be applied over the metallized layer 26 to prevent electrical contact of the metallized layer 26 with surrounding cables or electrically elements.

Figure 2:
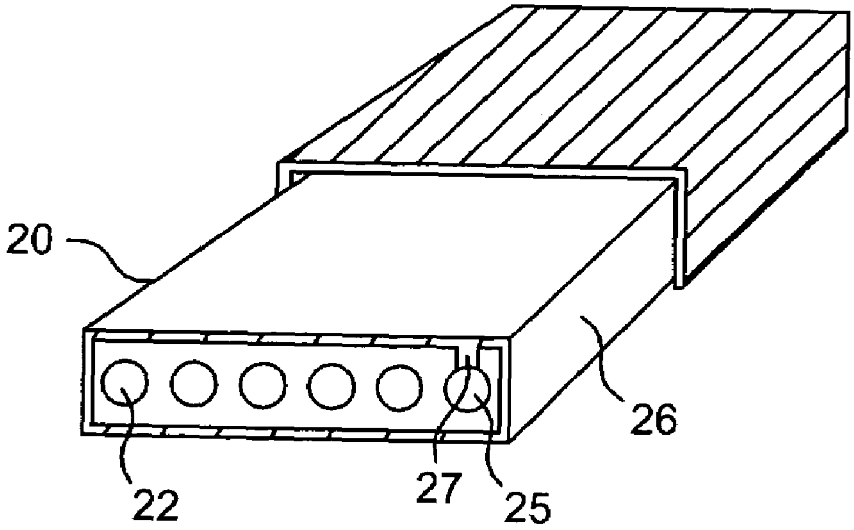
FIG. 2 is a simplified perspective view of a cable having a via exposing a ground trace to the metallized layer.

As shown in FIG. 2, in some embodiments, the metallized layer can be grounded through a ground trace 25 embedded within the dielectric substrate 24. A via 27 can be formed within the dielectric substrate to expose the ground trace 25. When the metallized layer is applied over the dielectric, the metallized layer 26 can enter the via 27 to electrically contact and ground the metallized layer. An insulating top coat (not shown) can be applied over the metallized layer 26 to insulate the metallized layer from surrounding electrical elements.

Figure 4:
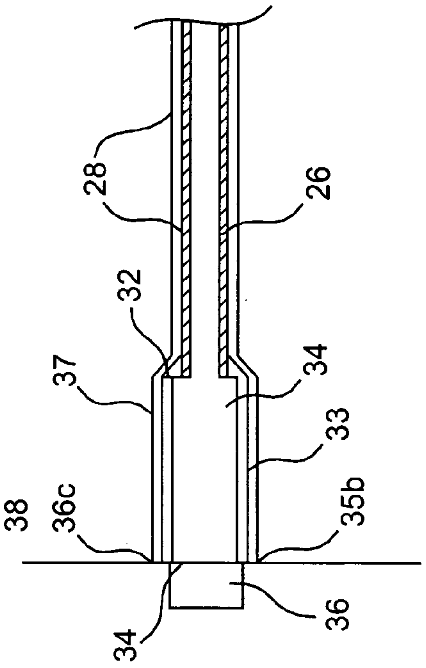
FIG. 4 is a simplified cross-sectional view of an end connector disposed along an end of the cable.
Figure 3:
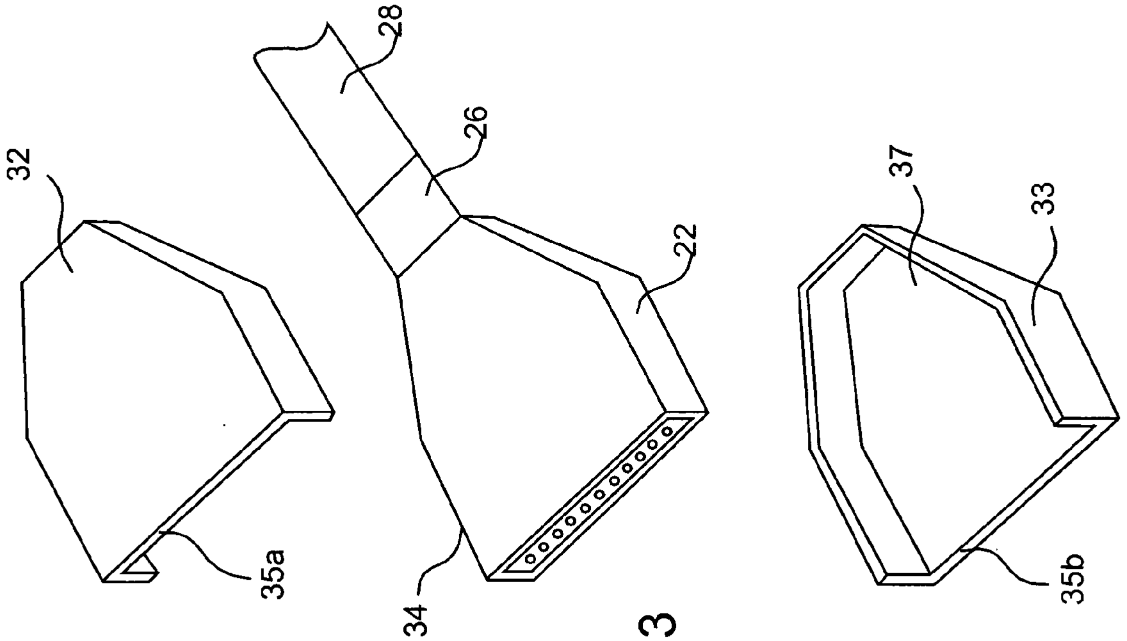
FIG. 3 is a simplified perspective view of a cable body and a metallized thermoform connector.
Figure 5:
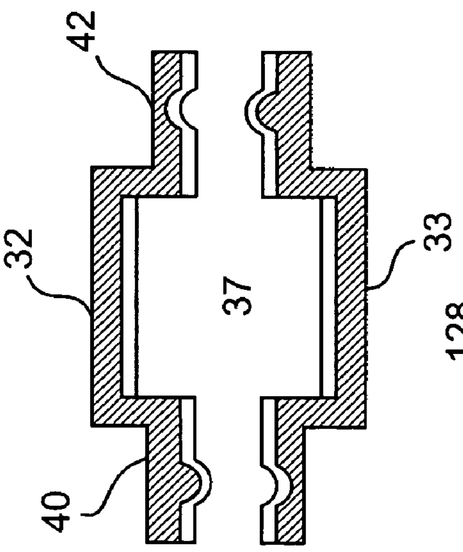
FIG. 5 is a simplified cross sectional view of a two piece metallized thermoform.

FIGS. 3 to 5 illustrate a connector assembly 30 of the present invention. The connector assembly 30 includes a first portion 32 and a second portion 33 that fits over a male/female electrical connector pin assembly 34. The first portion 32 and second portion 33 can have a contact surface 35*a*, 35*b* for electrically contacting the grounded housing so as to establish a grounding path between the cable and the grounded housing 38. A metallized layer 37 can be applied to an inside and/or outside surface of the connector assembly 30 for electrically contacting the metallized layer 26 of the cable and the grounded housing.

Referring now to FIG. 4, the conductors of the cable extend into the connector pin assembly and are connected to the connector pin (not shown). A printed circuit board (not shown) can be disposed within the connector pin assembly 34 to couple the conductive leads in the cable to the grounded housing 38. The connector pins 34 can detachably connect to a corresponding male/female electrical connector 36 of a grounded housing 38. In exemplary embodiments, the connector body 32, 33 is a metallized thermoform that can electrically connect the metallized layer 26 of the cable body to the grounded housing 38. A metallized layer 37 of the connector 30 can contact the metallized layer 26 at an exposed portion of the metallized layer 26 where the insulating top layer 28 has been removed or not coated. Electrical grounding of the metallized layer 26 can create a Faraday cage around the cable and connector which can prevent impingement and/or release of EMI.

FIG. 5 illustrates an embodiment of the thermoform connector assembly that uses overlapping or tongue and groove surfaces to connect the connector bodies 32, 33. A first side 40 of the connector assembly can have a bump and a second side 42 of the connector body can have a corresponding dip. The second connector body 33 of the connector body 33 can have a similar pattern so as to provide a combination that connects the two portions 32, 33 snugly around the connector pin assembly 34. It should be appreciated however, that various other conventional or proprietary methods can be used to secure the first end 40 to the second end 42 of the connector. For example, the ends can be attached with clamps, spring clips, a conductive adhesive, a conductive gasket, interference fit, laser welded, or the like. Such configurations can allow disassembly of the connector a number of times without damaging the EMI/RFI shielding capability of the cable assembly.

Figure 7:
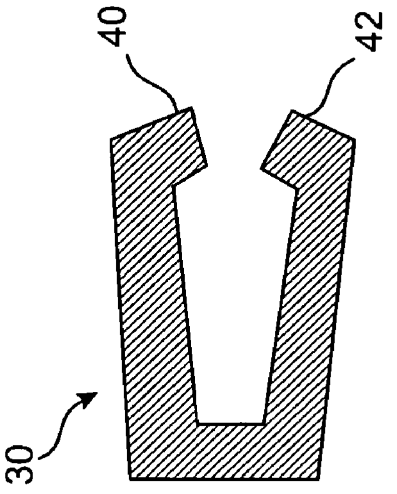
FIGS. 7 and 8 illustrate an open and closed position of one embodiment of the split connector.
Figure 8:
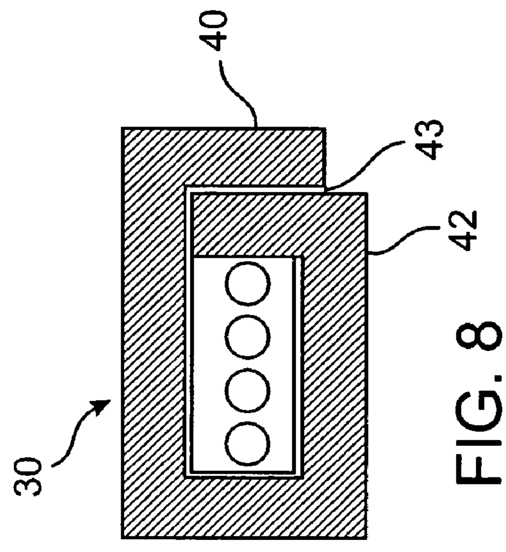
Figure 6:
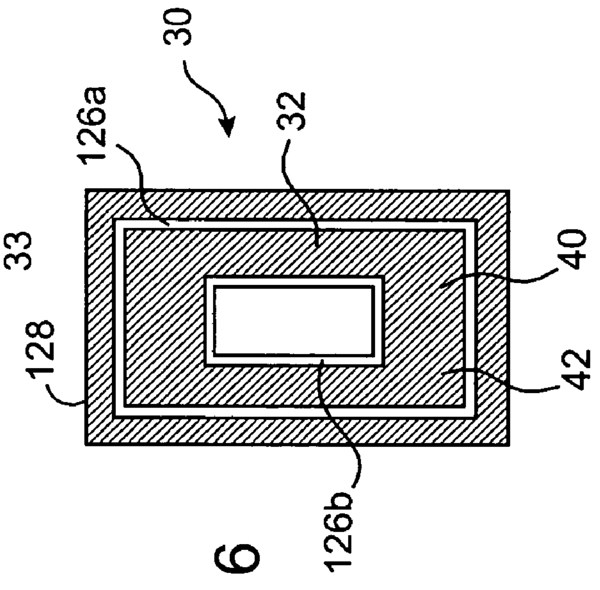
FIG. 6 is a simplified end view of the split connector disposed along the end of the cable.

As further shown in FIGS. 6 to 8, some embodiments of the connector 30 can be a one piece "clamshell" to facilitate attachment and detachment of the connector 30 from the cable body 22. A metal layer 126*a*, 126*b* can be applied to both an inner surface and outer surface of the thermoform 32. A non-conductive coating 128 can be applied over the outer metal layer to prevent the metallized layer from electrically interacting with other nearby circuits or electronic devices. In alternative configurations, the metallization can be applied only along the inner surface of the thermoform 32. In such configurations, an insulating layer is not needed. To contact the metallized layer of the thermoform with the metallized layer of the cable body 22, the insulating overcoat 28 of the cable can be partially removed adjacent the end of the cable body 22 to allow the metallized layer of the connector 30 to contact the metallized layer 26 on the cable (FIG. 3).

The thermoform can be snap fit so that a first end 40 of the thermoform overlaps, or otherwise attaches, to a second end 42 of the thermoform. In the illustrated configuration of FIG. 8, the metallized thermoform is interference fit with bumps 43 to connect the two ends of the thermoform.

Figure 9:
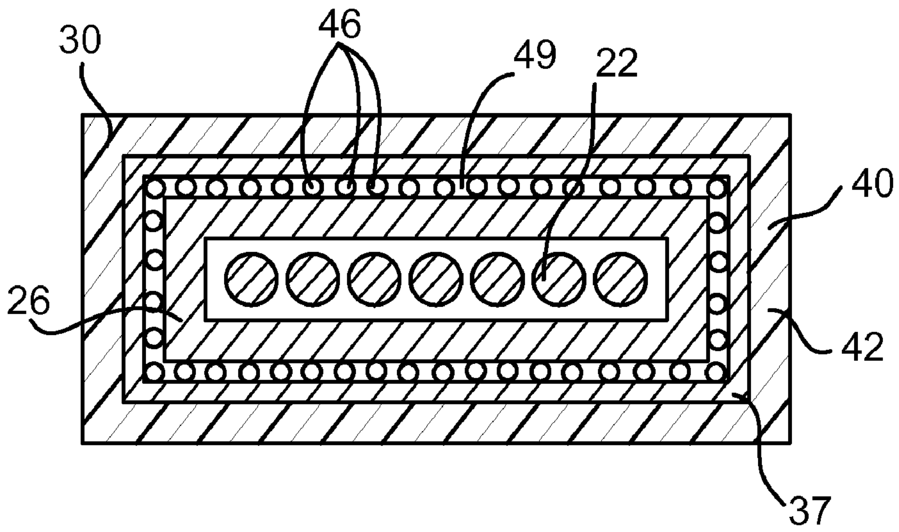
FIG. 9 is a cross-sectional view illustrating the contact between the connector and the cable.

FIG. 9 is a cross-sectional view of an exemplary electrical connection of the metallized surface 26 of the cable body with a metallized internal surface 37 of a metallized thermoform connector 30 (vacuum metallized with aluminum, copper, or other conductive materials). In some arrangements, small bumps 46 can be positioned along the inner surface 44 of the connector and/or the metallized surface 26 of the flexible cable 22 to create a pressure contact between the cable body 20 and the connector 30 to maintain the positions of the cable relative to the connector during assembly. The spacing of the bumps will depend on the frequencies of the EMI/RF emissions. Thus for higher frequencies, a closer spacing of the bumps is required to block the EMI/RF emissions. The height of the bumps is also designed in accordance with frequency considerations. Similarly, for high frequencies, the height of the bumps must be reduced so as to be able to block the high frequency emissions. Any gap 49 in the connector and metallized layer should be no larger than one-half a wavelength of the emitted EMI/RFI radiation.

Figure 10:
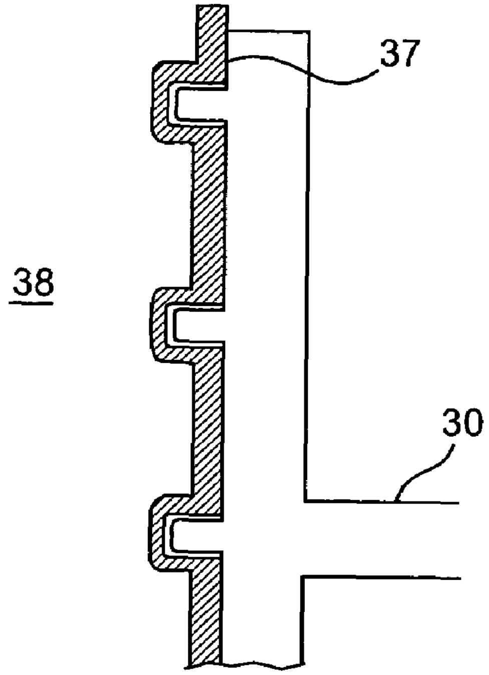
FIG. 10 is a cross-sectional view of a grounded housing coupled to the metallized connector.

FIG. 10 is a cross sectional view of an exemplary embodiment of an electrical contact between the grounded housing 38 and metallized connector 30. In the configuration shown, the metallized layer 37 on the connector assembly 30 is interference fit with the housing 38 to provide a continuous contact between the conductive mating surfaces of the housing 38 and connector 30. In other embodiments, the connector and housing can be connected with a clip, threadedly connected, pressure connected, adhesively connected, connected with a gasket, or the like.

Figure 11:
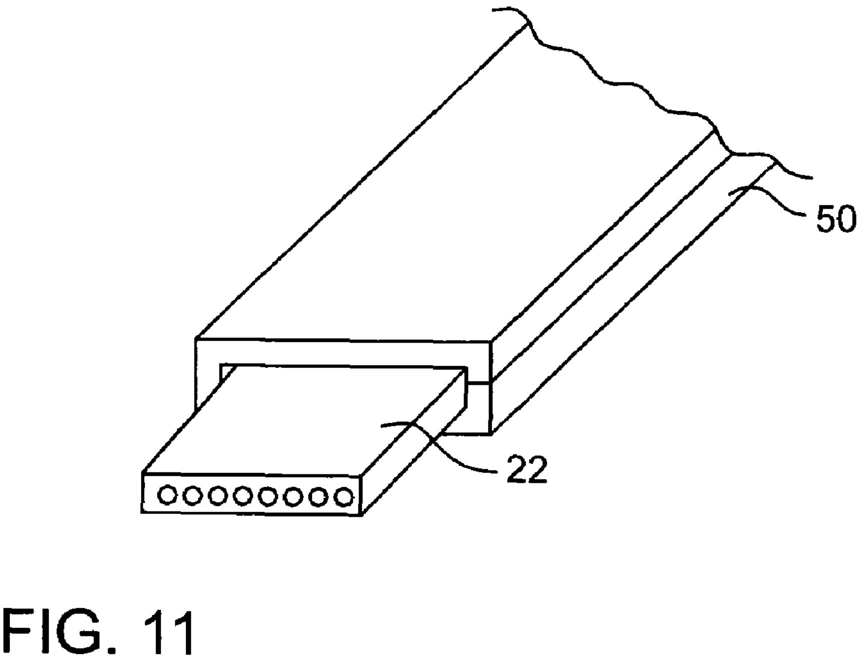
FIG. 11 is a perspective view of a metallized thermoform surrounding a cable.
Figure 12:
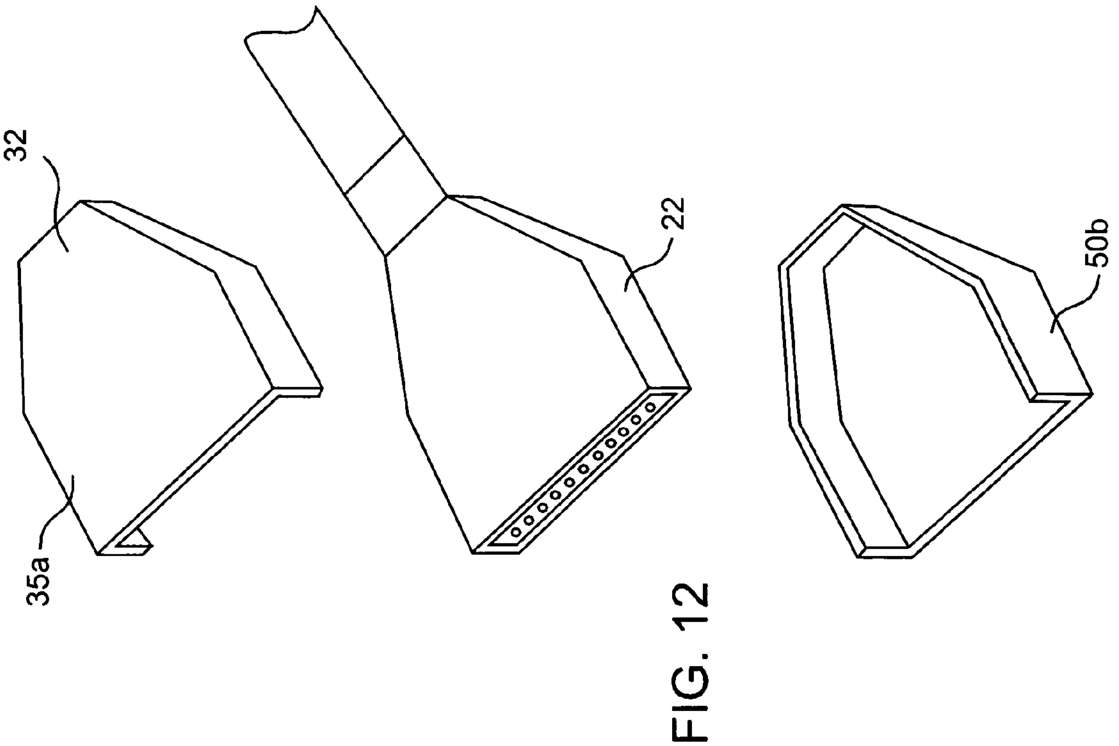
FIG. 12 is a perspective view of a two-piece metallized thermoform that has an integral connector assembly.

Alternative cable configurations are illustrated in FIGS. 11 and 12. The entire cable body 22 can be surrounded by a detachable metallized thermoform 50. The thermoform 50 can be externally or internally metallized to provide the EMI shield. A separate thermoform connector assembly (not shown) can be coupled to the connector pin assembly (not shown) to ground the cable shield. If the thermoform is externally metallized, an insulating layer can be applied over the metallized layer to prevent the metallized layer from electrically interacting with nearby electronic devices.

FIG. 12 illustrates a two-piece metallized thermoform 50*a*, 50*b* that has an integral body and connector portions. The metallized thermoform can be snap fit, or otherwise conformingly fit over the cable 22 and connector pin assembly. It is contemplated that the metallized thermoform can be manufactured and sold in a separate kit so as to allow users to retrofit their existing cables.

Figure 13:
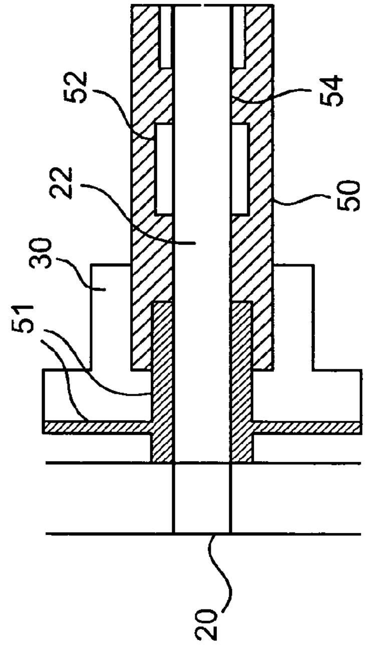
FIG. 13 illustrates a thermoform having ribs for facilitating bending of the thermoform and cable.

As illustrated in FIG. 13, the thermoform can be thinned or shaped to have regular openings 52 and ribs 54. The openings, cutouts, or corrugation reduce the cross-section of the entire assembly and allows for bending of the cable body. While the connector 30 is illustrated as a separate element of the cable thermoform 50, it should be appreciated that the thermoform connector 30 can be integrally formed with the thermoform 50 surrounding the cable body such that a single thermoform body can be attached over the body to completely shield the cable 22.

Figure 14:
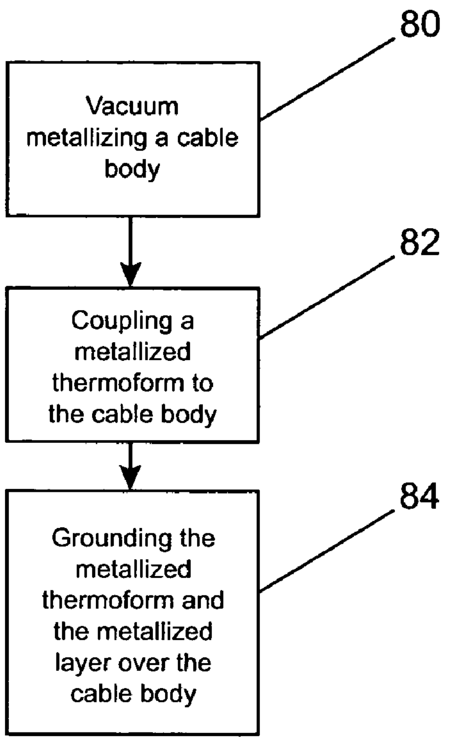
FIGS. 14 and 15 are simplified flow charts illustrating exemplary methods of the present invention.
Figure 15:
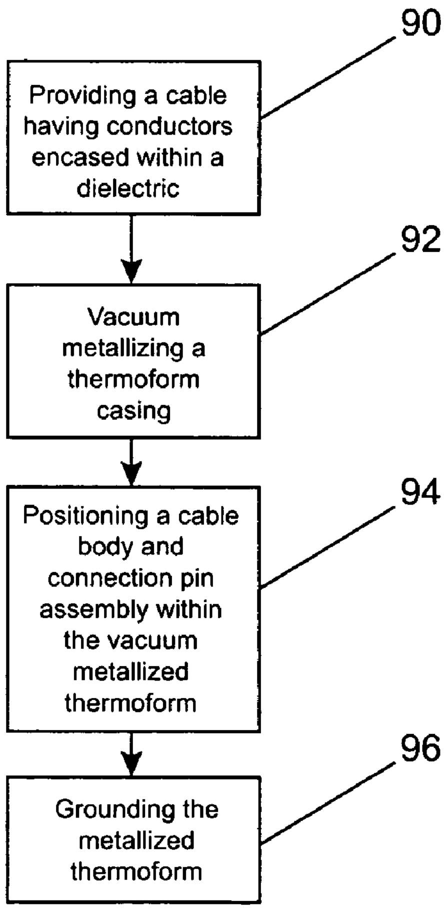

FIGS. 14 and 15 illustrate two exemplary methods of the present invention. As shown in FIG. 14, a cable body having conductors and a dielectric layer is metallized, preferably through vacuum metallization (Step 80). A metallized thermoform is electrically coupled to the metallized layer on the cable body (Step 82). The metallized layer is then grounded with a vacuum metallized thermoform connector assembly (Step 84). Optionally, the metallized layer can be insulated to prevent the metallized layer from contacting adjacent electronic or electrically conductive elements.

In the method illustrated in FIG. 15, a cable body is provided having conductors encased within a dielectric (Step 90). A thermoform casing is vacuum metallized (Step 92). The metallized thermoform is fit around the cable body and connection pin assembly (Step 94). The metallized thermoform is grounded to create an electromagnetic shield for the cable (Step 96).

As will be understood by those of skill in the art, the present invention may be embodied in other specific forms without departing from the essential characteristics thereof. For example, while rectangular cables and connectors are shown in the drawings, it should be appreciated that both round and rectangular connectors and cables can be accommodated by the present invention. Accordingly, the foregoing description is intended to be illustrative, but not limiting, of the scope of the invention which is set forth in the following claims.

What is claimed is:

1. A shielded cable comprising:

a cable body comprising electrical conductors disposed within an insulating substrate;

a vacuum metallized shielding layer disposed over the insulating substrate, and a metallized thermoform connector coupled to an end portion of the cable body and electrically coupled to the vacuum metallized layer, wherein the connector can be electrically coupled to a grounded housing so as to ground the shielding layer and connector.

2. The cable of claim 1 further comprising an insulating top coating disposed over the vacuum metallized layer to insulate the vacuum metallized layer.

3. The cable of claim 2 wherein the insulating top layer extends to a point short of the connector such that the connector is electrically coupled to the metallized layer.

4. The cable of claim 1 wherein the vacuum metallized layer has a thickness between approximately one-half micron to twelve microns.

5. The cable of claim 1 wherein the metallized thermoform is coupled to an outsize surface of a nonconductive connector.

6. The cable of claim 1 wherein the connector further comprises spaced protrusions, wherein the connector is electrically coupled to the metallized layer with the spaced protrusions.

* * * * *